United States Patent [19]

Jorzyk et al.

[11] Patent Number: 4,784,810
[45] Date of Patent: Nov. 15, 1988

[54] SMOKE GAS EXHAUST BY WAY OF A COOLING TOWER

[75] Inventors: Sigurd Jorzyk, Saarbrücken; Gerhard Scholl, Spiesen-Elvensberg; Heinz Hölter; Heinrich Igelbüscher, both of Gladbeck; Heinrich Gresch, Dortmund-Wickede; Heribert Dewert, Gladbeck, all of Fed. Rep. of Germany

[73] Assignee: Saarbergwerke Aktiengesellschaft, Saarbrücken, Fed. Rep. of Germany

[21] Appl. No.: 937,204
[22] PCT Filed: Mar. 4, 1986
[86] PCT No.: PCT/EP86/00111
§ 371 Date: Nov. 13, 1986
§ 102(e) Date: Nov. 13, 1986
[87] PCT Pub. No.: WO86/05577
PCT Pub. Date: Sep. 25, 1986

[30] Foreign Application Priority Data

Mar. 16, 1985 [DE] Fed. Rep. of Germany ....... 3509542
Mar. 16, 1985 [DE] Fed. Rep. of Germany ....... 3509543

[51] Int. Cl.$^4$ ................................................. B01F 3/04
[52] U.S. Cl. ........................... 261/17; 261/109; 261/79.2; 261/DIG. 46; 261/DIG. 11; 55/242; 55/257.1; B01F/3/04
[58] Field of Search ........ 261/109, 17, 79.2, DIG. 46, 261/DIG. 11; 55/242, 257 R

[56] References Cited

U.S. PATENT DOCUMENTS

| | | | |
|---|---|---|---|
| 2,970,671 | 2/1961 | Warner | 55/242 |
| 3,488,960 | 1/1970 | Kirkpatrick | 261/17 |
| 3,550,356 | 12/1970 | Abboud | 55/257 R |
| 3,581,467 | 6/1971 | Donnelly | 261/79.2 |
| 3,841,208 | 10/1974 | Knox | |
| 3,914,378 | 10/1975 | Selmeczi | 55/242 |
| 3,944,636 | 3/1976 | Schuldenberg et al. | 261/109 |
| 4,031,173 | 6/1977 | Rogers | 261/24 |
| 4,095,964 | 6/1978 | Carnicle | 261/17 |
| 4,157,368 | 6/1979 | Fernandes | 261/109 |
| 4,273,146 | 6/1981 | Johnson | 261/DIG. 46 |
| 4,371,563 | 2/1983 | Muehlberger | 55/257 QV |
| 4,397,793 | 8/1983 | Stillman et al. | 261/30 |

FOREIGN PATENT DOCUMENTS

| | | |
|---|---|---|
| 0155340 | 4/1984 | European Pat. Off. . |
| 0129775 | 1/1985 | European Pat. Off. . |
| 2228762 | 1/1974 | Fed. Rep. of Germany . |
| 2424059 | 11/1975 | Fed. Rep. of Germany . |
| 3318252 | 11/1984 | Fed. Rep. of Germany . |
| 967440 | 11/1950 | France . |
| 2263485 | 10/1975 | France . |
| 2290942 | 11/1975 | France . |
| 178153 | 9/1935 | Switzerland . |
| 1096539 | 12/1967 | United Kingdom . |
| 1528211 | 10/1978 | United Kingdom ......... 261/17 |
| 2078358 | 1/1982 | United Kingdom . |
| 2108255 | 5/1983 | United Kingdom . |

OTHER PUBLICATIONS

The Condensed Chemical Dictionary, Hawley, Tenth Ed., Van Nostrand Reinhold Co.

Primary Examiner—Tim Miles
Attorney, Agent, or Firm—Herbert Dubno; Ronald Lianides

[57] ABSTRACT

The present invention relates to a cooling tower for the cooling water that drains from the condensor of a steam generator or from the condensors of a plurality of steam generators; the tower is fitted with large-area inserts and these form a heat-exchange area into which the cooling water is passed; a rising flow of air passes through this zone in counterflow to the cooling water, the cooling tower being provided with a smoke-gas feed to introduce cleaned, preferably wet-cleaned, smoke gas into the flow of cooling air, which is connected to a plurality of gas outlet pipes, the outlet cross-sections of which open out into the cooling tower above the heat-exchange zone. In order to improve the introduction of the cleaned smoke gases into the flow of cooling air within a cooling tower, the present invention proposes that rotors be provided in the gas outlet pipes in the area of their outlet cross-sections. To this end, it is also possible to make each gas outlet pipe rotatable about its longitudinal axis, the angle of inclination of the gas outlet pipes being variable.

5 Claims, 5 Drawing Sheets

FIG.6 ent application corresponding to PCT/EP86/00111 filed Mar. 4, 1986 and based, in turn, upon West German National application Nos. P35 09 542.3 and P35 09 543.1 filed Mar. 16, 1985.

SMOKE GAS EXHAUST BY WAY OF A COOLING TOWER

CROSS REFERENCE TO RELATED APPLICATION

This application is a national phase application corresponding to PCT/EP86/00111 filed Mar. 4, 1986 and based, in turn, upon West German National application Nos. P35 09 542.3 and P35 09 543.1 filed Mar. 16, 1985.

FIELD OF THE INVENTION

The present invention relates to a cooling tower for the cooling water that drains from the condensor of a steam generator or from the condensors of a plurality of steam generators; the tower is fitted with large-area inserts and these form a heat-exchange area into which the cooling water is passed; a rising flow of air passes through this zone in counterflow to the cooling water, the cooling tower being provided with a smoke-gas feed to introduce cleaned, preferably wet-cleaned, smoke gas into the flow of cooling air, which is connected to a plurality of gas outlet pipes, the outlet cross-sections of which open out into the cooling tower above the heat-exchange zone.

BACKGROUND OF THE INVENTION

As a rule, it is only possible to maintain the limiting values for concentrations of toxic substances in smoke gas that is released into the atmosphere, which are laid down in the regulations governing the operation of major furnace systems by treating all of the smoke gas that results from combustion in a wet-washing system, with the addition of suitable absorbents. The purified smoke gas leaves the smoke gas sulfur removal plant at a temperature that is between 40° and 60° C. and for this reason must be reheated to approximately 80° to 120° C. before being able to rise when introduced into a chimney. It is obvious that a great deal of energy is needed in order to do this. As an example, in a 70 MW power station operating under full load in excess of 2.5 million cubic meters of smoke gas has to be reheated every hour.

In order to avoid having to reheat the smoke gas that is produced in power stations, it has already been proposed that the purified smoke gases be introduced into the flow of cooling air above the heat exchange zone and the cooling air that is flowing upwards be used as a means of transporting the purified smoke gases so as to introduce them into the atmosphere. By so doing, it is possible to avoid the costs involved in reheating the smoke gases. Furthermore, it becomes possible to dispense with the construction of a chimney in power stations that are to be built. A further advantage of this procedure is the additional dilution of the smoke gases and thus the concentration of residual toxic materials that is obtained thereby. However, a prerequisite for this is a thorough and even mixing of the smoke gases that are introduced with the rising cooling air.

In a known plant of this type the introduction of the smoke gases into the flow of cooling air in the cooling tower takes place through chimney-like gas outlet pipes arranged above the heat-exchange zone in the vicinity of the center of the cooling tower; these gas outlet pipes are connected to a central smoke gas feed. The ends of the gas outlet pipes are angled so that the flow of smoke gas has a radial flow component that is directed into the cooling tower cross-section. This is indispensable for thorough mixing with the cooling air. In order to improve the smoke-gas distribution in the flow of cooling air, immediately behind the outlet cross-section of the gas outlet pipes there are insert plates; these essentially extend these pipes on the flow surface, broaden out towards their ends, and are wound spirally, being intended to swirl the flow of smoke gas that is introduced and thereby contribute to an intensive mixing with the cooling air that is moving upwards. These insert plates, which are at their end areas almost normal to the direction of flow of the cooling air, have an undesirable effect on the cooling-air flow itself. At least a part of the cooling air that flows upwards is deflected and additionally swirled. The loss of energy for the cooling-air flow that is connected with this leads, ultimately, to a reduced exit velocity and, as a direct consequence, to a smaller lift height and poorer dispersal of the mixture that emerges from the head of the tower. This can be a disadvantage, especially in the case of a changeable weather situation.

Furthermore, since the flow of smoke gases is directed relatively far in the radial sense by the inserts, the result can be that the undiluted smoke gas impacts on the walls of the cooling tower and there, because of the concentration of residual toxic substances, forms acid droplets. In order to avoid corrosion damage on the walls of the tower it is therefore essential to have a costly protective coating at these places.

OBJECTS OF THE INVENTION

It is an object of the present invention to provide an improved arrangement for the introduction of purified smoke gases into the flow of cooling air of a cooling tower which permits an extensively loss-free introduction of the purified smoke gases into the flow of cooling air with at least a degree of mixing that is at least equally good.

It is a further object of the invention to make it possible to avoid the impact of undiluted smoke gas flow on the walls of the cooling tower, and thus avoid the formation of drops of acid thereon.

SUMMARY OF THE INVENTION

According to the present invention, these objects have been attained by rotors which are installed in the gas outlet pipes in the vicinity of their outlet cross-sections.

When the smoke gas flows through the rotors the emerging gas flows are forced into an additional swirling motion; because of the swirling that takes place at the edge of the flow, a very good mixing with the rising cooling air takes place without interfering with the actual upward movement of the cooling air.

Since there is no radial deflection of the smoke gas by insert plates, in addition to an increase in the absolute path of the individual particles of smoke gas that results from the forced additional circular motion, the unobstructed path of the smoke gas flow is also increased, so that the danger of the undiluted smoke gas impacting on the walls of the cooling tower is greatly reduced.

In the simplest case, the rotors can be free-wheeling, which is to say only moved by the smoke gas that moves through them. In this case, no additional energy will be removed from the flow of smoke gas, apart from that caused by frictional losses. The rotational speed of the rotor and the intensity of the spin motion will then depend exclusively on the configuration of the rotor, for example, of the profile and set of the rotor blades and the velocity of the smoke gas flow.

It is preferred, however, that the rotors have variable speed drives so that both axial speed and spin velocity of the emerging gas flow can be influenced by changing the speed of rotation, and optionally matched to changing operating conditions of the cooling tower. In particular, however, the projection side of the emerging smoke gas flow can be influenced and so adjusted that a radial path that is sufficiently large to ensure even distribution of the smoke gases in the cooling air flow is made available, but, on the other hand, it is ensured that the flow of smoke gases cannot impact on the walls of the cooling tower. The rotational speed of the rotors can be controlled, for example, by a process computer, either in combination or singly, depending on one or a plurality of representative command variables, e.g., the exit velocity of the cooling-tower cloud, the distribution of the concentration of toxic substances, or the temperature in the outlet cross-section of the cooling tower. Additional monitoring of the degree of acidity on or adjacent to the walls of the cooling tower will ensure that the projected range of the smoke-gas flow remains restricted, and that no undiluted smoke gas impacts on the walls of the cooling tower. In order to provide for further optimization of the smoke-gas distribution it may also be expedient to configure the gas outlet pipes so that they can be angled at their ends, and so that in addition to control of axial and spin velocity by rotational speed it is also possible to change the angle of exit of the smoke-gas flow relative to the vertical axes of the outlet pipes or the cooling tower.

According to the present invention, the object has also been attained in that each gas outlet pipe can be rotated about its longitudinal axis.

Because the gas outlet pipe can be rotated about its longitudinal axes, which can be arranged, for example, by a simple rotational drive, depending on existing demands, the direction of the flow of exhaust gas emerging from the outlet pipes can be varied while the angle of inclination of the pipe relative to the horizontal remains constant. The result of this is that depending on the existing flow velocity of the vertically rising cooling air, on the one hand, and on the other hand of the smoke gas flow that is moving at an angle to this, it is possible to arrive at a direction of flow for the flow of smoke gas that ensures an optimal flow path for the smoke gas and thus optimal mixing with the cooling air, without the gas coming into contact with the walls of the cooling tower.

Because of the fact that, according to a second feature of the invention, the angle of inclination of the gas outlet pipe can be altered, there is an additional degree of freedom, with the result that the direction of flow of the emerging smoke gas can now be changed spatially, with additional possibilities for optimizing the course of the flow within the cooling tower and thus of dispersion behavior on entering the atmosphere. For example, by suitably changing the angle of inclination it is possible to adjust the kinetic energy of the individual flows of smoke gas to increase the speed of the rising cooling air and thus improve lift within the cooling tower. This can be of particular interest during periods of unfavorable weather.

According to a further feature of the present invention the different outlet pipes are so adjusted that the end points of the velocity vectors of the smoke gas flows leaving the outlet pipes lie tangent to one or a plurality of concentric circles described about the axis of the cooling tower. By this means, a rotating, swirling motion can be imparted to all of the total quantity of gas passing through the cooling tower. A vortex of this type, being a relatively stable flow-dynamic formation, contributes to the fact that dispersion in the atmosphere above the cooling tower is greatly improved, since the gas mixture will penetrate further into the atmosphere than a normal flow because of its vortex-like course.

Most expediently, the supply of smoke gas is effected through a ring duct arranged at the center of the cooling tower, the individual pipes being oriented upwards and suitably and separately connected to the ring duct, for example, through suitable circular mounts. With such an arrangement it is expedient to configure the individual pipes so that they can be adjusted for height, for example, by means of a suitable telescoping arrangement.

Since, for reasons of flow technology, the cross-section of a cooling tower is not constant, adjustment for height entails the added advantage of being able to adjust the outlet pipes at the optimal level. Under some circumstances it can also prove expedient to displace the opening of the outlet pipes to the upper edge area of the cooling tower and permit the smoke gases to escape to the atmosphere in the turbulent transition area between the cooling tower and the atmosphere. Of course, the fact that the outlet pipes can be adjusted for height can also be exploited if, for example, during operational breakdown of the smoke gas sulfur removal plant hot, unpurified smoke gas, which must not be allowed to come into contact with the walls of the cooling tower, has to be vented.

Instead of being located in the central area of the cooling tower, a ring line that serves as a smoke gas feed line can also be disposed in the peripheral area of the cooling tower, along the inner or the outer side of the cooling tower walls; in this connection, if the arrangement outside the cooling tower is used, the individual gas outlet pipes pass through the cooling tower walls at specified locations.

The optimization of the course of the flow of cooling air and the smoke gas or the mixture of cooling air and smoke gas, for example, or during varying load conditions of the power station as well, can be effected automatically, e.g., by means of a suitable control computer. To this end, characteristic values for the course of the flow or the dispersion above the cooling tower, for example, exit velocity, distribution and change of concentrations of a characteristic smoke gas component such as $CO_2$ or $H_2O_3$ or $H_2CO_3$ concentrations are measured on the inside wall of the cooling tower and compared with corresponding nominal values. It is possible to vary the setting of the various outlet pipes, according to the variations that are observed, for example, by adjusting motors that are controlled by the process computer.

It is also possible to combine the foregoing features with each other.

The present invention also includes a cooling tower of this kind with vapor traps in the cooling tower.

With a series connected smoke gas sulfur removal plant, that operates with limestone rocks, for example, the solids content in the wash water amounts to approximately 20%, i.e., 200 g/liter of wash liquid. This means that despite a demister there is still up to 600 g of wash liquid passing through the gas outlet pipe per hour with 20% solids, which equals 120 kg solids precipitated, which can fall back in the cooling tower as rain. At an operating time of 8000 hours annually, this amounts to 960 t of solids, which are normally throughput without any harm being done and which, to a considerable extent, not only clog the demister battery but also coat the adjacent vapor trap in the cooling tower with deposits so that it becomes necessary to clean the vapor traps and the demister battery at the very time at which the power station normally has to be operating at peak availability.

A further object of the present invention is to eliminate these deficiencies and this has been achieved in that droplet traps or vapor traps have been installed in the gas outlet pipes or pipes in the vicinity of their outlet cross-sections, with which both on the upstream and on the downstream sides are associated nozzle devices, so that these can be flushed periodically from above and below; this can be done with a relatively large range of droplet sizes so that the mass of water can flush down the agglomerated particles that have built up on the downstream side.

Figure 1:
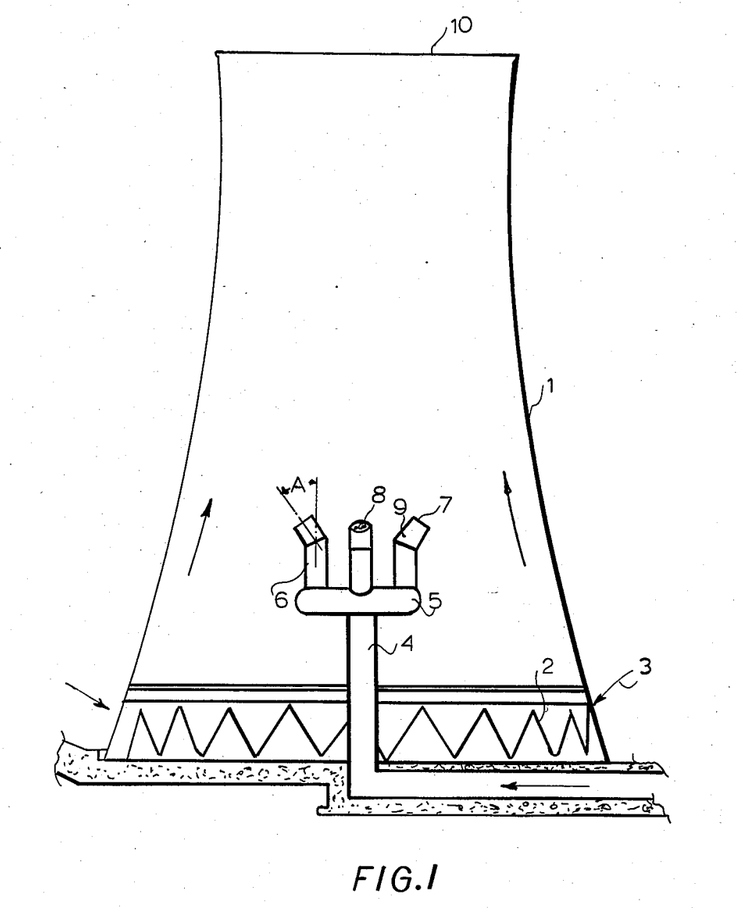

As viewed in the direction of flow of the smoke gas that is introduced, the cross-section of the gas outlet pipe or pipes tapers inwardly leaving the droplet or vapor traps. These reduced cross-sections increase the velocity of the flow so that the solids contained in the droplets are spread for many kilometers over a very wide area by the dispersal system technology. To this end, it is advantageous to select velocities that are many times in excess of the ones that are normal in the cooling tower. There is a possibility of introducing the smoke gas into the cooling tower not only by one feed, but by a plurality of such feeds, although of smaller diameters, which have to be increased after passing through the vapor trap so as to accomodate the droplet trap battery, after which they are once again reduced.

It is also possible to arrange for a plurality of smoke gas feed lines to open into a large, central demister, for example, in the middle of the cooling tower, and then introduce the smoke gas into the cooling tower above the vapor trap from one or a plurality of gas outlet pipes at a high velocity. An additional important feature of the present invention is the provision of a collector for the wash water from the droplet trap battery or the demister trap battery. By this means, it is possible to collect the cleaning water from the demister and the vapor trap batteries separately and then use it again in the demister and vapor trap batteries after the smoke gas sulfur removal plant, which ensures that the existing demister battery and the vapor trap can be cleaned with comparatively small quantities of fresh water and that the wash water is not transferred to the wash process, but can be removed separately, without any significant additive products such as polycarbonic acids, EDTA and/or NTA, as essential waste water, without the need for special biological or chemical processing plants.

Only when these droplet washer systems are flushed with additional additive water must this water be subjected to additional water processing, for example, biological or chemical water processing.

In order to avoid the water carrying over from the smoke gas sulfur removal plant into the cooling towers it is known that a droplet separator can be incorporated immediately after the smoke gas sulfur removal plant before the smoke gas is passed into the clean-gas connector pipe line to the cooling tower. The formation of condensate by cooling the purified gas on the way to the cooling tower and, for example, the 200 mg of the residual droplets picked up from the droplet separator after the smoke gas wash—enriched with solids from the smoke gas wash system—cause a considerable load in the smoke gas feed lines that open out into the cooling tower.

In order to avoid this, a further feature of the present invention proposes that the speed of the rising smoke gas feed within the cooling tower air be so reduced that the precipitating film of liquid in the smoke gas feed or feeds tends to form large droplets that are not carried along by the outlet velocity and then introduced into the cooling tower.

For this reason, the present invention proposes that the velocity selected be lower than 8 m/sec, preferably approximately 5 m/sec. This means that the film of liquid in the rising smoke gas feed or feeds falls in the form of large drops and imposes no load on the droplet separator and the end or ends of the smoke gas feed or feeds. The present invention also proposed the incorporation of drop-forming projections on the inside walls, in the rising smoke gas feeds; these form the film of liquid on the walls into drops which then fall into the sump or trap in the smoke gas feeds.

It is known that so-called demister batteries can be provided after wet-type smoke gas sulfur removal plants. The droplets from the smoke gas sulfur removal plants contain solids and are, as a rule, slightly acidic. The demister batteries are usually washed with fresh water. As a rule, this is neutral and may, in part, contain lime, i.e., it is comparatively hard. It is unfortunately impossible to avoid the fact that the solids from the acid droplets combined with the water that is used as wash water and is of a certain hardness leads to incrustation of the demister battery.

For this reason, the present invention proposes that no fresh water be used, but rather that the droplet water be collected, purified and then formic acid be added to this water so that the pH is reduced. The carboxylic acid, preferably formic acid, simultaneously serves to dissolve the lime, so that with the wash water in processed form, i.e., containing no solids and containing lime-dissolving carboxylic acid, the demister battery is kept clear and clean. By these means it is possible to ensure that no additive water—which has to be removed later on—is added to the wash water, but rather that water that is used in the wash system is processed and used for flushing.

BRIEF DESCRIPTION OF THE DRAWING

Features of the present invention are explained in greater detail below, on the basis of the diagrammatic drawings in which:

FIG. 1 is a cross-section of a first embodiment of a cooling tower according to the invention;

FIG. 2 is a sectional view of a second embodiment of a cooling tower;

FIG. 3 is a plan view of a third embodiment of a cooling tower;

FIG. 4 is a sectional view of a fourth embodiment of a cooling tower;

FIG. 5 is a sectional view of a fifth embodiment of a cooling tower; and

FIG. 6 is a schematic diagram of the water system for a demister battery.

SPECIFIC DESCRIPTION

In the embodiment shown in FIG. 1, cooling air 3 that enters from the side flows transversely through the heat exchange zone 2 of a cooling tower 1 shown as an example in this figure. The cooling air 3, warmed by the heat exchanger 2, rises within the cooling tower 1 and is released to the atmosphere at the head 10 of the cooling tower.

The purified smoke gases are passed through a central smoke gas feed 4 and a ring duct 5, centered on the vertical axis of the tower, to the individual smoke outlet pipes 6 and mixed with the cooling air that is flowing upwards within the cooling tower 1, above the heat exchange zone 2.

Rotors 8 are arranged within the gas outlet pipes 6 in the vicinity of their outlet cross-sections 7, and these rotors impart an additional spinning motion to the smoke gas as it emerges, and this leads to intensive mixing of the smoke gases with the rising cooling air. The rotors have associated variable speed controllers—not shown herein—and these can be operated individually or collectively. By varying the rotational speed of the rotors 8 it is possible to match the axial and rotational speeds of the smoke gas flows to the various conditions under which the cooling tower 1 operates, which means that selection of suitable control variables, and optionally the use of a process-control computer, will ensure optimization of the ejection range of the flow, the rotational impulse and thus the dispersal of the smoke gas, for example, with due regard to the profile of toxic substance concentrations or the gas egress velocity at the head 10 of the cooling tower. Additional monitoring of the acidity level on or adjacent to the walls of the tower can be used to limit the ejection range of the smoke gas flow so that no undiluted smoke gas can reach as far as the walls of the cooling tower.

In addition, the end portions 9 of the smoke outlet pipes 6 are set at an angle to the vertical axis of the pipes, so that a further parameter—the angle A—is made available for optimizing the introduction of the smoke gas flow and distributing this flow.

In the exemplary version that is shown, the gas outlet pipes 6 are essentially vertical and arranged at the centre of the cooling tower. However, the smoke gas can also be introduced through a ring duct 5 that is arranged on or close to the walls of the cooling tower and through gas outlet pipes that are connected to this, it then being advantageous that the gas outlet pipes be essentially horizontal, such that their end portions can be angled upwards relative to the horizontal.

Figure 2:
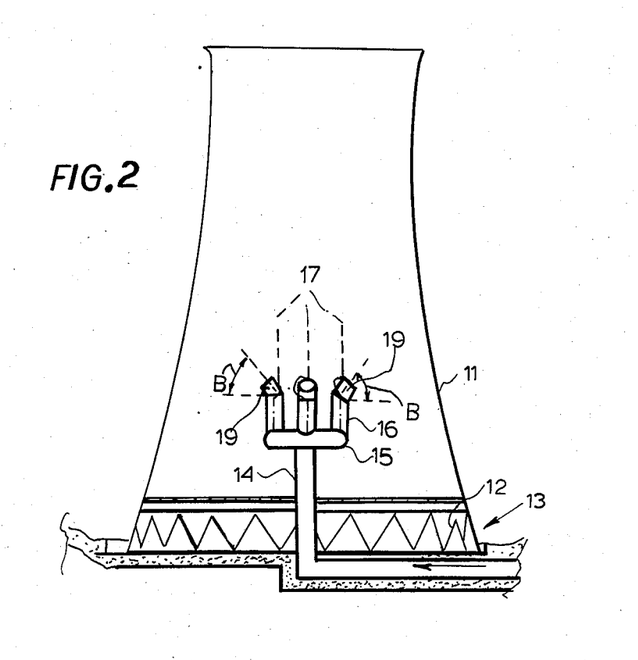

FIG. 2 shows a cooling tower 11 for a coal-fired generating station, this tower having a trickle bed 12 for direct heat exchange between the cooling water and air. The air is fed to the cooling tower in the direction indicated by the arrow 13.

At the same time, wet-cleaned smoke gas from the smoke gas sulfur removal plant of the power station is introduced into the cooling tower 11 through a trunk 14 that opens into the ring duct 15 that is arranged inside the cooling tower centered on the axis thereof. The smoke gases move from the right duct into the various gas outlet pipes 16 that are angled upwards at their ends 19, thus forming the angle B with the horizontal. In order to achieve optimal mixing of the smoke gases with the cooling air that is flowing upwards through the cooling tower, depending on the various conditions under which the cooling tower operates or depending on different climatic conditions, the various gas outlets pipe are so configured that they can be rotated about their longitudinal axes 17. Furthermore, it is possible to change the angle B and adjust the height of the gas outlet pipes 16.

In order to make it possible to rotate the gas outlet pipes 16, change the angle at which the ends are set, and adjust them for height, use can be made of conventional technology that needs no further description.

Figure 3:
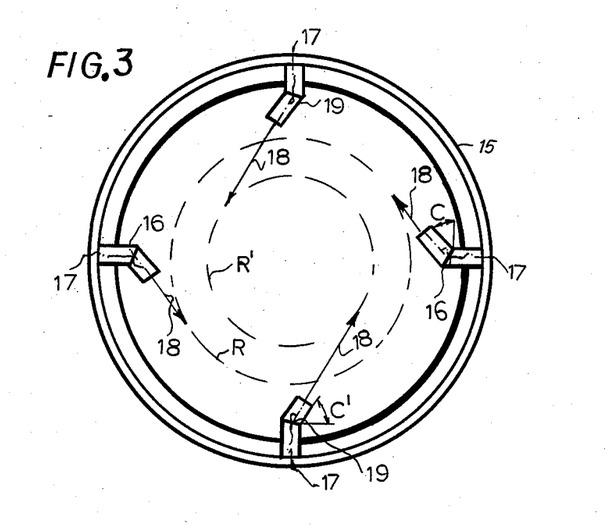

FIG. 3 is a plan view of a further exemplary version of the arrangement according to the present invention. Here, a ring duct 15 is used as a central smoke gas feed line, and is arranged outside the cooling tower and centered on the axis thereof. The gas outlet pipes 16, each of which can be rotated about its axis 17 and which in this version pass through the walls of the cooling tower, are angled at their ends by the angles C and C', such that the velocity vectors 18 of the emerging gas flows are tangent to two different concentric circles R and R' described about the vertical axis of the cooling tower. In this way, it is possible to add a circulating motion to the gas mixture that is flowing upwards within the cooling tower.

Figure 4:
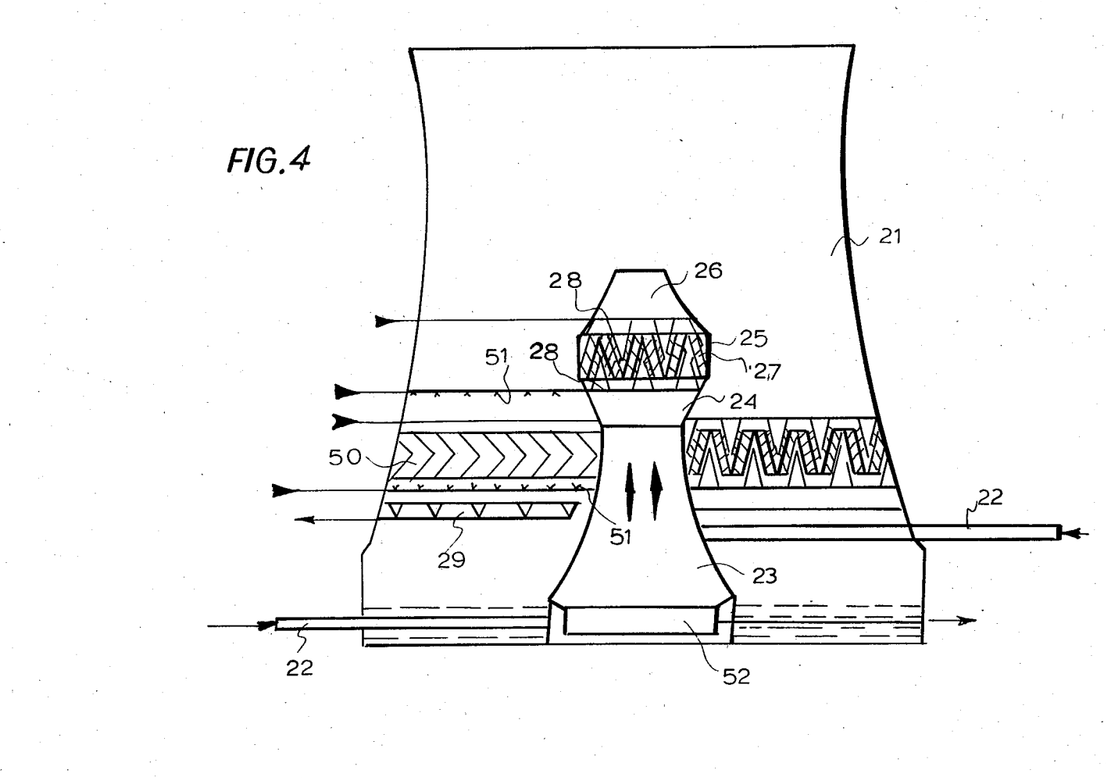

In the version that is shown in FIG. 4, the cooling tower 21 is connected with smoke gas feed lines 22. The smoke gas feed lines 22 pass into a centrally arranged gas outlet pipe 23, which passes through the vapor trap 50 that is arranged at the center of the cooling tower 21.

The gas outlet pipe 23 has a tapered section 24 that makes a transition and becomes the expanded section 25, and this then makes another transition and becomes another tapered section 26. A droplet separator battery 27 is located within the expanded section 25.

Nozzle assemblies 28 are arranged both on the upstream and the downstream sides of the droplet separator battery 27, as well as nozzle assemblies 51 arranged on the upstream and downstream sides of the vapor trap 50. The vapor traps 50,27 are in the form of V-shaped vapor traps.

Beneath the vapor traps 50 and 27 there are respective collectors 29 and 52 for the wash water that drains from the droplet separator batteries 50, 27.

Figure 5:
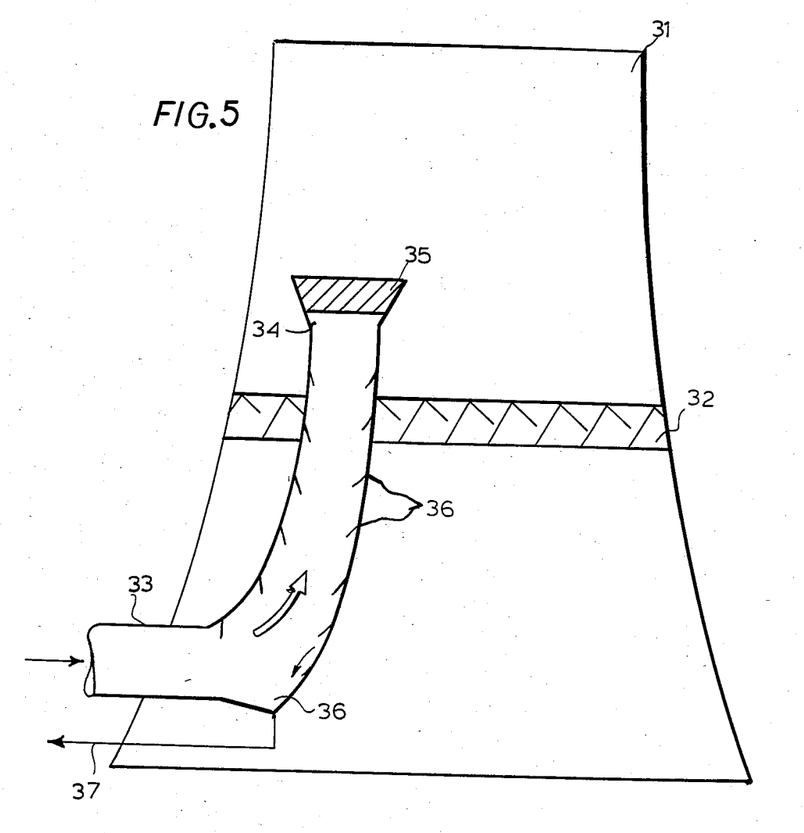

In the version that is shown in FIG. 5, the cooling tower 31 has a vapor trap 32 and a gas feed 33. The gas feed 33 becomes the ascending gas outlet pipe 34, at the end of which there is the droplet separator 35. Within the inner walls of the gas outlet pipe 34 there are projections 36 on which the droplets form. The droplets fall into the sump 36, and can be removed through a drain line 37.

Figure 6:
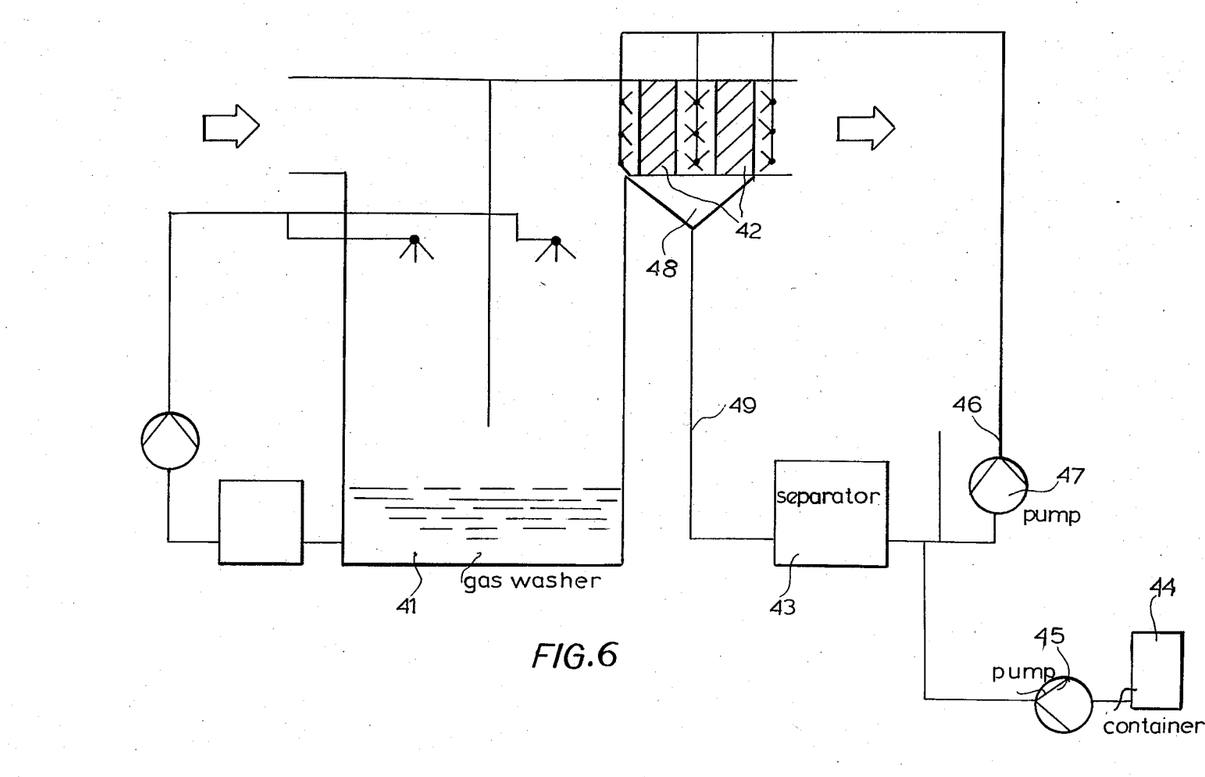

In the version shown in FIG. 6, the smoke gas washer 41 of known design feeds into a demisting battery 42, as is used in the exemplary version that is shown in FIGS. 4 and 5. The demister battery 42 is connected to a water/solids separator 43, for example in the form of a decanter. Within a container 44 there is carboxylic acid, which is delivered to the line 46 by the pump 45 through which the dosed liquid is delivered by the pump 47 to wash the demister battery 42. The droplet water from the demister battery 42 is collected by the hopper 48 and delivered to the water/solids separator 43 through the line 49. In this way it is possible to use no fresh water for washing, but rather to collect this water, clean it, and add formic acid so as to reduce the pH.

We claim:

1. A cooling tower for condensor water from a steam power plant comprising:
a cooling tower centered on an upright axis;
a heat exchanger disposed in a lower portion of said tower and extending over substantially an entire cross-section thereof and traversed by condensor water in counterflow to cooling air rising through said heat exchanger;

a smoke-gas feed connected to said tower and formed with at least one gas outlet pipe disposed above said heat exchanger for introducing cleaned, preferably wet-cleaned smoke gas into the flow of rising air through a free end of said gas outlet pipe, said free end being angled upwardly and said gas outlet pipe being rotatable about a longitudinal axis thereof; and a rotor disposed in said free end, said rotor being provided with a variable-speed drive enabling freewheeling of said rotor when said rotor is not driven.

2. The cooling tower defined in claim 1 wherein the angle of inclination of said free end can be adjusted.

3. The cooling tower defined in claim 1 further comprising a plurality of gas outlet pipes wherein respective velocity vectors of flows of said smoke gas leaving respective free ends of said pipes lie tangent to one or a plurality of concentric circles described about the axis of said cooling tower.

4. The cooling tower defined in claim 1 wherein said gas outlet pipe can be adjusted for height.

5. The cooling tower defined in claim 1 wherein said smoke-gas feed is formed as a ring duct surrounding the outside of said tower, said gas outlet pipe extending radially from said ring duct through a wall of said tower to the interior thereof.

* * * * *